Aug. 21, 1962 M. KORFF ETAL 3,050,686
DIRECT COUPLED BOOTSTRAP SAWTOOTH GENERATOR
Filed Feb. 12, 1959 2 Sheets-Sheet 1

INVENTORS
MARVIN KORFF
HOWARD M. SCOTT
BY
ATTORNEYS

United States Patent Office 3,050,686
Patented Aug. 21, 1962

3,050,686
DIRECT COUPLED BOOTSTRAP SAWTOOTH GENERATOR
Marvin Korff, Haddonfield, N.J., and Howard M. Scott, Philadelphia, Pa., assignors, by mesne assignments, to the United States of America as represented by the Secretary of the Navy
Filed Feb. 12, 1959, Ser. No. 792,934
3 Claims. (Cl. 328—176)

The present invention relates to a sawtooth generator and more particularly to a sawtooth generator of the bootstrap type providing an ultralinear output under changing frequency conditions.

A sawtooth generator is an electronic circuit device producing a sawtooth or triangular type of output wave. Frequently such a generator is employed to provide sweep voltage for the deflection plates or coils of a cathode ray tube causing its electron beam to traverse between the said plates or coils. In modern day radar and missile systems it is highly essential that the generated sawtooth be very linear with time so that the sawtooth itself can be used as an accurate time base.

The common method of producing a sawtooth wave is the repeated charging and discharging of a capacitor through a resistor connected to some source of supply voltage. The capacitor may be periodically clamped to a predetermined potential and then allowed to charge or discharge through the afore-mentioned resistor, a sawtooth wave being produced across the capacitor. In order to make the wave form of voltage appearing across the capacitor linear with respect to time, a positive feedback loop is often added to the basic circuit for the purpose of raising the voltage applied to the afore-mentioned resistor. The capacitor is thus made to charge towards an ever increasing voltage and its rate of charge is ideally held constant. The voltage applied to the resistor is made to vary identically with the output sawtooth derived across the capacitor, but is maintained at a higher voltage level in order that a charging current may exist through the resistor and capacitor combination.

Heretofore, in order to maintain the afore-mentioned voltage differential, an intermediate battery or a voltage standard has been employed in the feedback circuit. Alternatively, the circuit has been A.C. coupled with direct current isolating capacitors in order that the D.C. voltage level of the feedback could be adjusted entirely independently of the input wave. It has been found that use of these expedients results in certain inaccuracies. The auxiliary voltage source, in addition to being unhandy, is subject to voltage change, whereas the coupling capacitors themselves present a discharge circuit whose time constant quite affects the linearity of the wave procured from the main charging capacitor. Unless the coupling capacitor is made extremely large, the sawtooth wave produced will be altered in linearity with changes in the repetition frequency or duty cycle at which the circuit operates.

One conventional bootstrap system employs a cathode follower feedback amplifier and employs a coupling capacitor connected between the cathode of the cathode follower and the top of the resistor through which the sawtooth generating capacitor is charged. The repetition frequency of the sawtooth generated is determined by a switching system or gate connected across the charging capacitor. It has been found that unless an extremely large feedback coupling capacitor is employed, or alternatively, a very small amplitude sawtooth wave is generated, the linearity of the sawtooth wave will be deleteriously affected by changes in the frequency rate at which the sawtooth generating capacitor is gated. Also, the slope of the sawtooth varies with duty factor as the average voltage across the coupling capacitor varies with duty factor. In addition, there is a limit to the linearity obtainable as the gain of the cathode follower can only approach unity.

Accordingly, it is an object of this invention to provide improved apparatus for generating an extremely linear sawtooth wave whose linearity is not affected by changes in its repetition frequency or duty cycle.

It is another object of this invention to provide an improved sawtooth generator employing direct in-phase coupling in a positive feedback loop without the use of an intermediate voltage source.

It is another object of this invention to provide an improved sawtooth generator for producing selectable positive or negative linear output sawtooth waves.

Other objects and many of the attendant advantages of this invention will be readily appreciated as the same becomes better understood by reference to the following detailed description when considered in connection with the accompanying drawings wherein.

In accordance with the invention, a resistor-capacitor sawtooth generating circuit is provided with a positive feedback loop feeding the source end of the resistor, the feedback loop including a direct coupled amplifier circuit. The amplifier is adjustable to unity gain and at the same time provides an output in phase with the sawtooth across the capacitor for application to the source end of its associated resistor.

According to one feature of the invention, the direct coupled amplifier employs a cathode-follower stage driving a grounded-grid amplifier for proper connection to the resistor of the R-C combination.

According to another feature of the invention, the capacitor of the R.-C. combination is normally clamped at an intermediate positive voltage. The coupling between the cathode-follower stage and the grounded-grid stage is made variable as well as the grid bias on the grounded-grid stage, thereby producing an output of selectable slope and polarity.

Figure 1:
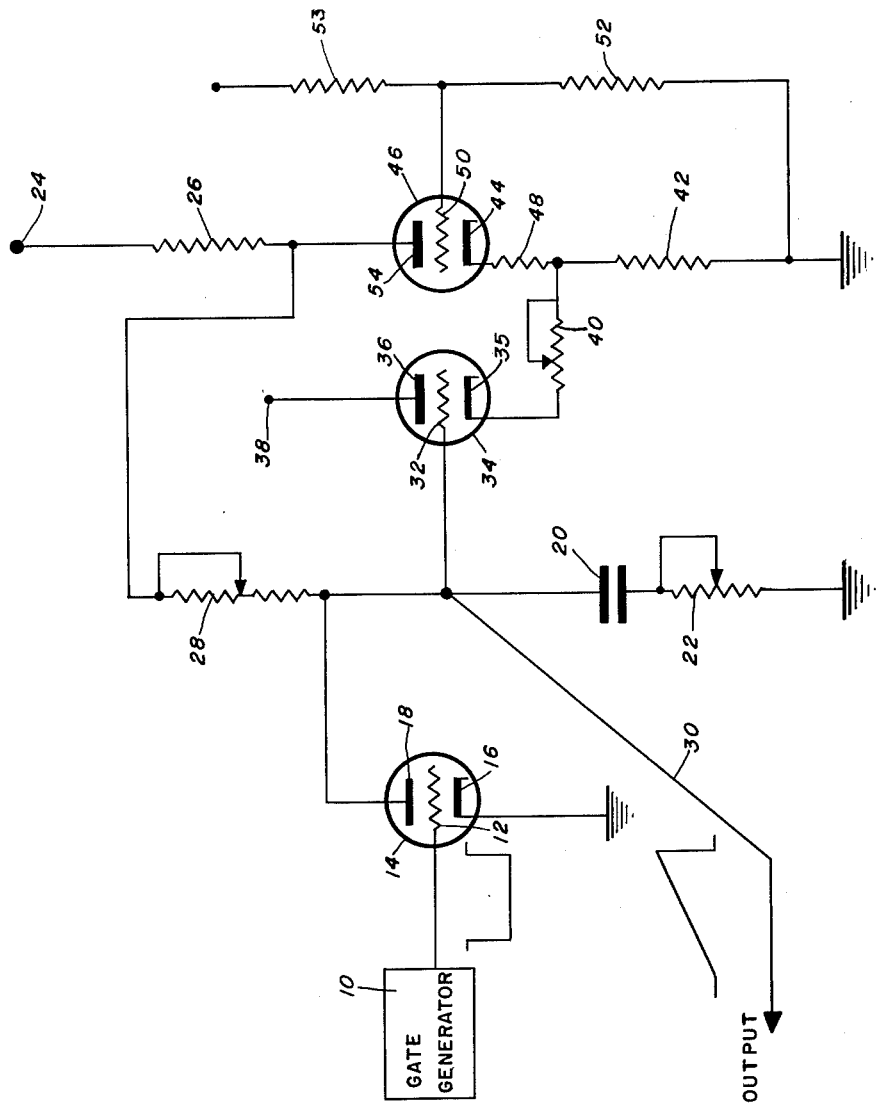
FIG. 1 is a schematic diagram of a principal embodiment of the invention.

Referring now to FIG. 1, a square wave producing gate generator 10 drives the grid 12 of a triode gate tube 14, the cathode 16 of which is returned to ground. The anode 18 of tube 14 is coupled to the top of sawtooth producing capacitor 20, one plate of which is adjustably connected to ground through variable resistor 22. This latter resistor may be omitted, if desired, or may be employed as a peaking control for producing an initial step in the sawtooth. Terminal 24, for connection to a source of positive voltage, provides for current flow through load resistor 26, adjustable charging resistor 28, the sawtooth determining capacitor 20, and resistor 22 all in series. Output connection 30 is taken from the high voltage end of capacitor 20. This same point also drives grid 32 of the first stage or tube 34 of a direct coupled amplifier. The plate 36 of this stage is connected to a positive voltage terminal 38 for supplying operating voltage. Tube 34 operates as a cathode follower employing variable resistor 40 and resistor 42 in series to ground as the load for cathode 35. Resistor 42 is also common to cathode 44 of the second stage 46 of the D.C. amplifier in series with resistance 48 to cathode 44. Tube 46 operates as a grounded-gird stage, that is, the input signal is applied to the cathode thereof by means of common resistor 42 and the grid 50 of the stage 46 is returned to ground through grid resistor 52. Plate 54 of stage 46 employs the afore-mentioned resistor 26 as its plate load and plate current is derived from terminal 24.

In operation, the circuit of FIG. 1 provides a sawtooth output at output lead 30 connected to the charging capacitor 20. A negative square wave input supplied to the grid 12 of gate tube 14 essentially cuts off tube 14 which previously clamped the top of capacitor 20 at a voltage equal to the conducting plate voltage of tube 14. When this tube is cut off, capacitor 20 begins to charge through resistors 22, 28 and 26 toward the voltage supplied at plate 54 (R28 large in respect to R26, tube current through R26 determines E, the voltage across the R.-C. circuit composed of resistors 28 and 22 and capacitor 20). But for the positive feedback loop comprising tubes 34 and 46, an exponential wave would appear at the output 30. However, the rising voltage appearing across capacitor 20 is also applied to the grid of the first stage of the D.C. amplifier. The D.C. amplifier is adjusted to exactly unity gain by means of adjustable resistor 40 so that the same slope wave appears at plate 54. The voltage level of this output signal may be adjusted to the correct voltage for producing a charge current by selecting proper values for cathode resistor 42, grid resistors 52 and 53, and plate resistor 26. Since the rise in voltage of plate 54 is identical to the rise in voltage at plate 20 there being no phase inversion in the D.C. amplifier, the voltage across the charging resistor 28 remains constant, which insures no change in charging current of capacitor 20. The voltage ramp appearing at the top of capacitor 20 will then be extremely linear since there is no other capacitor in the circuit to charge during charge time or "retrace" time. There is also no requirement for a direct current source between the amplifier and the R.-C. combination.

Figure 2:
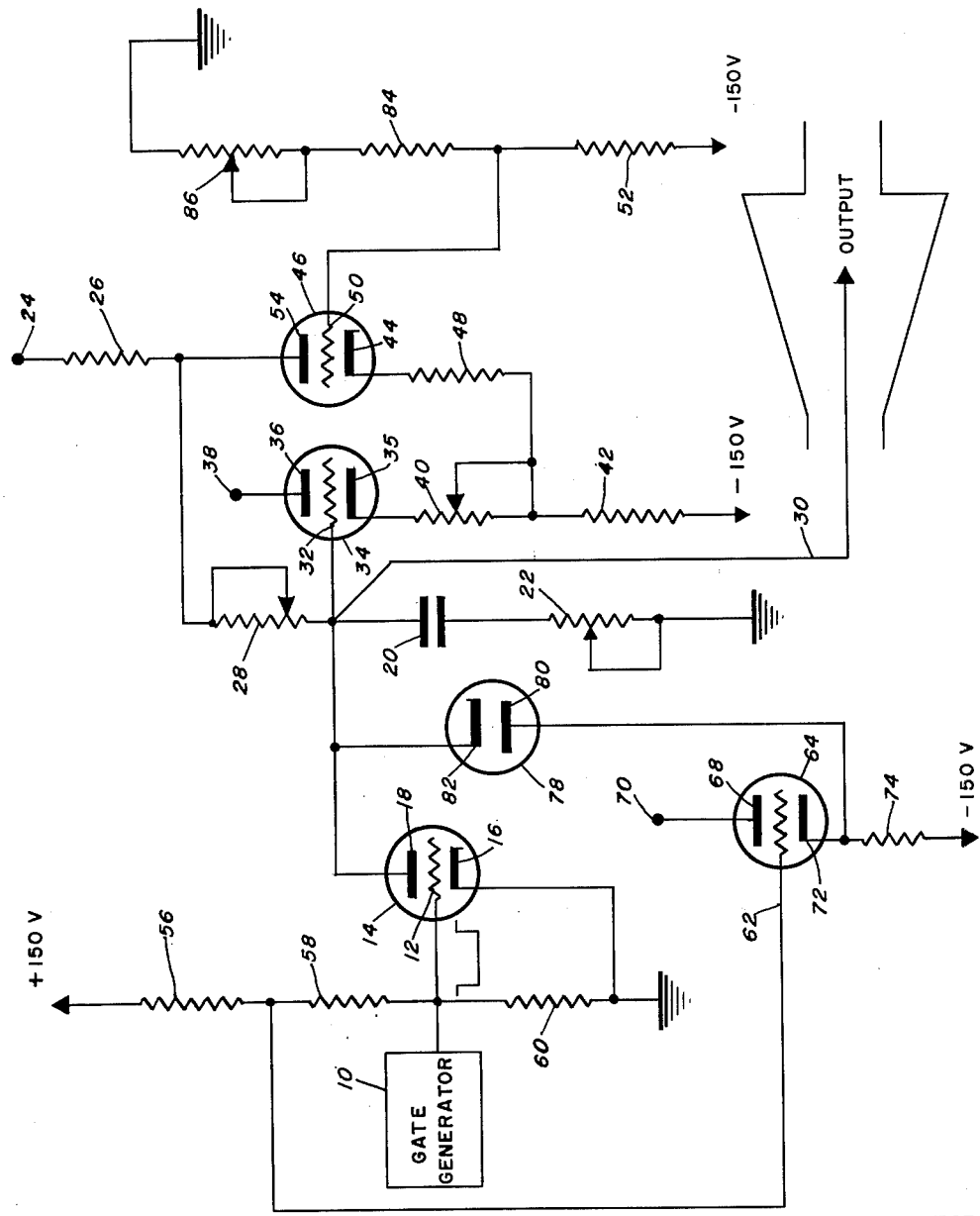
FIG. 2 is a schematic diagram of an embodiment of the invention illustrating an additional feature for producing selectable positive and negative output waves of adjustable slope.

A variation of the present invention illustrating additional features is shown in FIG. 2, wherein gate generator 10 generates negative going pulses for the purpose of biasing tube 14 to cut off as hereinbefore described. The generator 10 also supplies these negative pulses to a voltage divider connected between a positive 150 volts and ground consisting of resistors 56, 58 and 60 in series being fed at the juncture between resistors 58 and 60. The negative going pulses appearing at the juncture of the two resistors 56 and 58 are also coupled to grid 62 of cathode follower tube 64, the anode 68 of which is connected to a terminal 70 for an application of a proper operating voltage thereto. Cathode 72 of tube 64 is returned to a source of minus 150 volts through cathode resistor 74. Cathode 72 is also coupled to the top of charging capacitor 20 through the plate-cathode circuit of positive clamp diode 78 having its anode 80 connected to cathode 72 and cathode 82 connected to the top of the charging capacitor 20. Anode 18 of tube 14 is also connected to the same point and it is seen that when a negative gate voltage is produced by gate generator 10, not only will the gate tube 14 be rendered nonconductive but so will cathode follower tube 64 thus effectively removing clamp tube 78 from the circuit. During retrace time, that is, when no gate pulse is received from the gate generator, the plate 18 of tube 14 is clamped to a positive voltage equal substantially to the voltage present at cathode 72 of cathode follower tube 64. This low impedance path provides a constant base line for the output sawtooth wave.

In other respects this embodiment is the same in structure and operation of the embodiment of FIG. 1 with the following exception: The output is made adjustable in slope and polarity by means of the introduction of an adjustable grid bias at grid 50 of amplifier tube 46. A voltage divider including resistor 52, resistor 84 and a variable resistor 86 is connected between a source of minus 150 volts and ground, with the grid 50 being tapped at the juncture between resistors 52 and 84. As resistor 86 is varied, the grid bias of tube 46 is correspondingly changed resulting in a change in the quiescent voltage level at plate 54 of the stage. Therefore, the voltage towards which the charging capacitor 20 charges can be altered up and down. Since the cathode circuitry of the tubes 34 and 46 is now returned to a minus 150 volts through resistor 42 (with readjustment in the voltage supplied at terminal 24), it is seen that capacitor 20 may be made to either charge towards a voltage more positive than its quiescent clamped value, or alternatively, discharge towards a voltage negative with respect to its clamped value. The output wave is also thereby adjustable to various selectable slopes. The slope and polarity of the sawtooth are adjusted by means of variable resistor 86, with resistor 40 being readjusted as necessary to re-establish the unity gain of the direct coupled amplifier, such unity gain providing the linearity desired.

It is seen that the present invention provides a linear sawtooth generator applying a positive in-phase feedback to an R.-C. sawtooth circuit at a sufficiently high potential to procure proper charging operation thereof. The result is accomplished without need of either coupling capacitors or auxiliary voltage sources. A variable linear sawtooth output across the capacitor can also be obtained giving the circuit considerable utility in precision timing and counter circuits, PPI and TV type displays, or wherever extremely linear and cycle insensitive sawtooth generation is required.

Obviously many modifications and variations of the present invention are possible in the light of the above teachings. It is therefore to be understood that within the scope of the appended claims the invention may be practiced otherwise than as specifically described.

What is claimed is:

1. A linear sawtooth generator comprising: a source of positive voltage with respect to ground; a first resistor, a second resistor and capacitor serially connected between said source of positive voltage and ground; a gate tube connected across said capacitor for receiving unblanking pulses to permit current flow into said capacitor from said voltage source; a direct coupled D.C. amplifier receiving its input from across said capacitor; said D.C. amplifier comprising, a first triode tube and a second triode tube, said second triode tube having a pair of cathode resistors in series to ground and a grid resistor connected to ground, a coupling resistor connected between the cathode of said first triode tube and the juncture of said two cathode resistors; and a direct connection between the anode of said second triode tube and the juncture of said first and second resistors.

2. A linear sawtooth generator comprising: a capacitor; a first resistor connected to said capacitor and constituting an R.-C. circuit therewith; means for determining the quiescent voltage level across said capacitor; a direct coupled amplifier deriving its input from said capacitor and comprising, a first cathode-follower stage, a second amplifier stage having an adjustable grid bias, adjustable coupling means between the cathodes of said two stages, a load resistor for said second stage; and purely resistive connection means between the anode of said second stage and said first resistor.

3. A linear sawtooth generator comprising: a capacitor; a resistor for conducting current to said capacitor and constituting an R.-C. circuit therewith, a first triode tube connected across said capacitor for receiving a gated input, a diode clamp tube having its cathode connected to said capacitor for also receiving a gated input, a direct coupled amplifier deriving its input from said capacitor, said amplifier comprising first and second stages having a common cathode circuit, said common cathode circuit including two separate branches at least one of which is of variable resistance, and a common resistance branch, an adjustable grid bias means connected to the grid of said second stage for maintaining said second stage at a preselected voltage, and a direct coupling between the output of said second stage and said first resistor.

(References on following page)

References Cited in the file of this patent

UNITED STATES PATENTS

| | | |
|---|---|---|
| 2,414,486 | Rieke | Jan. 21, 1947 |
| 2,419,606 | Stodola | Apr. 29, 1947 |
| 2,513,722 | Harris | July 4, 1950 |
| 2,532,534 | Bell | Dec. 5, 1950 |
| 2,562,188 | Hance | July 31, 1951 |
| 2,562,295 | Chance | July 31, 1951 |
| 2,576,339 | Gray | Nov. 27, 1951 |
| 2,594,104 | Washburn | Apr. 22, 1952 |
| 2,597,322 | Higinbotham | May 20, 1952 |
| 2,817,016 | Custer | Dec. 17, 1957 |
| 2,850,629 | Tobias | Sept. 2, 1958 |
| 2,864,949 | Gleason | Dec. 16, 1958 |
| 2,897,453 | Mansford | July 28, 1959 |